United States Patent [19]

Ukihashi et al.

[11] 4,123,602
[45] Oct. 31, 1978

[54] TERPOLYMERS OF TETRAFLUOROETHYLENE, ETHYLENE AND PERFLUOROALKYL VINYL MONOMER AND PROCESS FOR PRODUCING THE SAME

[75] Inventors: Hiroshi Ukihashi, Tokyo; Masaaki Yamabe, Machida; Haruhisa Miyake, Yokohama, all of Japan

[73] Assignee: Asahi Glass Company, Ltd., Tokyo, Japan

[21] Appl. No.: 867,894

[22] Filed: Jan. 9, 1978

Related U.S. Application Data

[63] Continuation of Ser. No. 689,526, May 24, 1976, abandoned.

[51] Int. Cl.$^2$ .................. C08F 210/02; C08F 214/18; C08F 214/26
[52] U.S. Cl. ............................. 526/206; 204/159.22; 526/230; 526/253; 526/255
[58] Field of Search ............... 526/206, 253, 255, 230; 204/159.22

[56] References Cited

U.S. PATENT DOCUMENTS

| | | | |
|---|---|---|---|
| 3,445,434 | 5/1969 | Stilmar | 526/255 |
| 3,804,817 | 4/1974 | Wall et al. | 526/253 |

Primary Examiner—Harry Wong, Jr.
Attorney, Agent, or Firm—Oblon, Fisher, Spivak, McClelland & Maier

[57] ABSTRACT

Copolymers of tetrafluoroethylene and ethylene essentially consist of components of from 40 to 60 mole % of tetrafluoroethylene, 40 to 60 mole % of ethylene and 0.1 to 10 mole % of perfluoroalkyl vinyl component having the formula

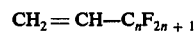

$$CH_2 = CH - C_nF_{2n+1}$$

wherein $n$ is an integer of 2 to 10. Said copolymer has a volumetric flow rate of 10 to 500 mm$^3$/sec. defined in the specification.

The copolymers of tetrafluoroethylene and ethylene are produced by copolymerizing tetrafluoroethylene and ethylene with a molar ratio of $C_2F_4/C_2H_4$ being kept essentially higher than 40/60 in the reactor in the presence of a small amount of a perfluoroalkyl vinyl monomer having the formula

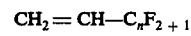

$$CH_2 = CH - C_nF_{2+1}$$

wherein $n$ is an integer of 2 to 10.

34 Claims, No Drawings

TERPOLYMERS OF TETRAFLUOROETHYLENE, ETHYLENE AND PERFLUOROALKYL VINYL MONOMER AND PROCESS FOR PRODUCING THE SAME

This is a continuation of application Ser. No. 689.526, filed May 24, 1976, now abandoned.

BACKGROUND OF THE INVENTION

The present invention relates to novel copolymers of tetrafluoroethylene and ethylene and a process for producing the same.

More particularly, it relates to novel copolymers of tetrafluoroethylene and ethylene having improved properties which are produced by copolymerizing tetrafluoroethylene and ethylene with a small amount of a perfluoroalkyl vinyl monomer, and the process for producing the same. It has been known to produce copolymers of tetrafluoroethylene and ethylene which are characterized by excellent chemical resistance and excellent thermal stability and good insulating properties by copolymerizing tetrafluoroethylene and ethylene in the presence of a polymerizaion initiator. These copolymers are known to be useful as raw materials for preparing various shaped articles, electric wire coating and corrosion resistant linings, etc., because of their excellent properties, and significant melt processabiltiy.

It has been proposed to copolymerize tetrafluoroethylene and ethylene with an auxiliary amount of a vinyl comonomer which has no telogen activity and causes a side chain having at least two carbon atoms in order to improve physical characteristics at high temperature especially tensile characteristics at high temperature for copolymers of tetrafluoroethlene and ethylene (such as Japanese Patent Publication No. 23671/1972 and U.S. Pat. No. 3,624,250).

In accordance with these processes, it is possible to overcome the disadvantage that a coating of a copolymer of tetrafluoroethylene and ethylene on a wire becomes brittle at high temperature to cause cracks even under low stress.

However, when the vinyl comonomer which forms a side chain having at least two carbon atoms, is used, the advantageous effect can be attained for improvement of tensile characteristics at high temperatures but various disadvantages are found in industrial purposes.

For example, when the copolymerization of tetrafluoroethylene and ethylene is carried out by adding a perfluoroolefin having the formula $$CF_2 = CF - C_2F_5 \text{ and } CF_2 = CF - C_4F_9,$$

the rate (velocity) of the copolymerization is remarkably low.

When the polymerization of tetrafluoroethylene and ethylene is carried out by adding a vinyl ether having the formula $$CF_2 = CF - OR_f \text{ such as } CF_2 = CF - OC_3F_7 \text{ or }$$

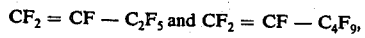

the tensile creep property of the resulting copolymer is deteriorated. For example, the copolymers of tetrafluoroethylene and ethylene which have about 2 to 3% of initial strain in the tensile creep test at 175° C under 30 Kg/cm² are changed to those having higher than 7% of the initial strain by the introduction of the vinyl ether monomer. When a hydrofluoroolefin or a vinyl ester comonomer such as $$CF_2 = CF - CH_2 - C(CF_3)_2OH \text{ or}$$

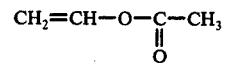

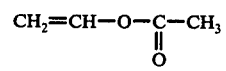

is a copolymerized, the resulting copolymer has a lower heat resistance, for example, the heat resistance of longer than 200 hours in an ageing test at 230° C for measuring the period for which the elongation at 23° becomes half compared with initial elongation is decreased to 80 to 100 hours or lower by the introduction of the side chain in the copolymer of tetrafluoroethylene and ethylene.

SUMMARY OF THE INVENTION

It is an object of the present invention to provide copolymers of tetrafluoroethylene and ethylene which have excellent physical properties and improved tensile characteristics at high temperature without deterioration of the tensile creep property and the heat resistance.

The object of the invention can be attained by copolymerizing tetrafluoroethylene and ethylene with a small amount of perfluoroalkyl vinyl monomer such as perfluorobutylethylene, perfluorohexylethylene, etc..

The invention is to provide novel copolymers of tetrafluoroethylene and ethylene which have a molor ratio of $C_2F_4$ to $C_2H_4$ of 40 : 60 to 60 : 40 and 0.1 to 10 mole % of perfluoroalkyl vinyl component having the formula $$CH_2 = CH - C_nF_{2n+1}$$

wherein $n$ is an integer of 2 to 10, and which have 10 and 500 mm³/sec. of a volumetric flow rate.

DETAILED DESCRIPTION OF THE EMBODIMENTS

The volumetric flow rate used in the specification is defined as follows. 1 g of a sample of the copolymer is extruded through a nozzle having a diameter of 1 mm and a length of 2 mm under a load of 30 Kg/cm² at a predetermined temperature by using a Koka-type flow tester. The volume of the extruded material per unit time is defined as the volumetric flow rate and the unit is mm³/sec. The predetermined temperature can be a temperature range which the ethylene-tetrafluoroethylene copolymer is melt-processable. That is, a temperature range between the temperature at which melt flow begins and the temperature at which thermal decomposition begins and it is near the temperature at which melt flow begins, i.e. the flowing temperature.

The predetermined temperature is selected from 260° – 360° C for ethylene-tetrafluoroethylene copolymer. The temperature used to measure the volumetric flow rate is lower than the temperture at which thermal decomposition of the copolymer begins.

The invention is also to provide a process for producing the copolymer of tetrafluoroethylene and ethylene having 0.1 to 10 mole % of a content of perfluoroalkyl vinyl component by copolymerizing tetrafluoroethylene and ethylene with a molar ratio of $C_2F_4$ to $C_2H_4$ being kept essentially of higher than 40/60 in the presence of a polymerization initiator and a small amount of perfluoroalkyl vinyl monomer having the formula $$CH_2 = CH - C_nF_{2n+1}$$

wherein $n$ is an integer of 2 to 10.

The copolymers of tetrafluorethylene and ethylene produced by the process of the invention have an improved tensile strength and elongation at high temperatures without substantial deterioration of excellent physical properties.

The coating of the copolymer of the invention on a wire is not brittle at high temperature and does not cause cracks under any stress.

In a characteristic feature, the small initial strain in the tensile creep test and the excellent heat resistance in the prolonged ageing test at high temperature are kept unchanged even though the side chain having at least two carbon atoms is introduced.

Moverover, the copolymers of the invention have such excellent resistance as no stress cracking in a nitric acid or ethylenediamine at 120° C in the environmental stress cracking test.

On the contrary, the conventional copolymers of tetrafluorethylene and ethylene have been satisfactory resulting in the environmental stress cracking tests.

Even though a side chain is introduced in the copolymer as proposed in the prior arts, the stress cracks are caused in a 60% nitric acid, ethylenediamine as well as nitrobenzene, dimethylsulfoxide, dimethylformamide, etc., at 120° C.

The copolymers of the invention have a volumetric flow rate of 10 to 500 mm³/sec. preferably 20 to 300 mm³/sec. whereby the copolymers can be melt processable and applied to extrusion molding, injection molding and the like, and are easily baked in a powder coating method or a dispersion coating method.

Suitable novel copolymers of the invention have a flowing temperature of higher than 240° C preferably 250° to 280° C and a thermal decomposition temperature of higher than 310° C preferably 330° to 370° C.

In the process for producing novel copolymers of the invention, the molar ratio of tetrafluoroethylene to ethylene in the monomer mixture is preferably greater than 2.35 and especially greater than 3.

In the preferable embodiments, the molar ratio is maintained in said range during the copolymerization.

For example, the initial feed molar ratio of $C_2F_4$ to $C_2H_4$ is selected in said range and the copolymerization is carried out by feeding tetrafluoroethylene and ethylene so as to supply the amounts corresponding to the consumptions.

Accordingly, in the process of the invention, the initial feed molar ratio of $C_2F_4$ to $C_2H_4$ is selected from the range of 70/30 to 90/10 preferably 75/25 to 85/15.

The copolymerization is carried out by supplying a mixture of tetrafluoroethylene and ethylene with a molar ratio of $C_2F_4$ to $C_2H_4$ of 40/60 to 60/40 preferably 45/55 to 55/45, whereby the copolymers having a tetrafluoroethylene content of 40 to 60 mole % preferably 45 to 55 mole % can be otained.

The specific perfluoroalkyl vinyl monomers used in the invention have the formula $$CH_2 = CH-C_nF_{2n+1}$$

wherein $n$ is an integer of 2 to 10 preferably 3 to 8.

The perfluoroalkyl group ($-C_nF_{2n+1}$) can be straight or branched and preferably $-C_4F_9$ and $-C_6F_{13}$.

When $n$ is too large, the physical properties of the copolymer are inferior and the rate of the copolymerization is lower disadvantageously.

When $n$ is 1, the effect of the addition of the perfluoroalkyl vinyl monomer is too low to attain the improved effect.

When a monomer having an alkyl group which is not a perfluoroalkyl group ($n = 2$ to 10) is used, the resulting copolymers have inferior heat resistance.

The perfluoroalkyl monomers having the formula $$CH_2 = CH - C_nF_{2n+1}$$

(hereinafter referring to $CH_2 = CH - R_f$) used in the invention can be produced by various manners and can be easily available. The monomers can be easily produced by a dehydrohalogenation reaction of the addition product of a perfluoroalkyl halide with ethylene.

That is, $R_fCH_2CH_2X$ is produced by reacting $R_fX$ wth ethylene and the perfluoroalkyl vinyl monomer $CH_2 = CH - R_f$ is produced by elimination of HX from $R_fCH_2CH_2X$, wherein X is preferably Br or I and can be Cl.

The addition reaction can be carried out in the presence of a free radical catalyst at high temperature or under the irradiation of ultraviolet rays or ionizing radiation which are disclosed in J. Chem. Soc., 2856 (1946); ibid, 3041 (1950) by Haszeldine et al. and J. Org. Chem., 23 1166(1958) by Park, and U.S. Pat. No. 3,145,222 (1964).

The reaction product can be converted to the perfluoroalkyl vinyl monomer by the conventional dehydrohalogenation reaction.

The perfluoroalkyl vinyl monomer can also be available as the by-products obtained in various reactions using $R_fCH_2CH_2X$ (Japanese Patent Publication 18112/1964 and Japanese Unexamined Patent Publication No. 103504/1974).

In the copolymerization of the invention, it is preferable to be smaller amount of the perfluoroalkyl vinyl monomer and to be in a range of 0.1 to 10 mole %.

When the amount is too small, the tensile properties of the copolymers at high temperature is not improved effectively. On the contrary, when the amount is too much, the rate of the copolymerization is too low for the industrial opertion, and the tensile creep property and heat resistance of the resultant copolymers are inferior to those of the copolymers having no additional component.

The tensile strength and elongation of the conventional copolymer of tetrafluoroethylene and ethylene at 200° C are respectively as high as 20 Kg/cm² and as high as 40%, and the tensile strength and elongation of the copolymer including the perfluoroalkyl vinyl component are respectively higher than 30 Kg/cm² especially 40 to 80 Kg/cm² and higher than 200% especially 400 to 600%.

The disadvantages of brittle coating on a wire at high temperature and cracks under low stress can be overcome.

On the other hand, the initial strain in the tensile creep test at 175° C under 30 Kg/cm² can be lower than 10%, and especially it is less than 5% in the case of about 0.3 to 1.0% of the content of the perfluoroalkyl vinyl monomer.

The ageing test at 230° C mentioned above, gives longer than 200 hours of the retention of elongation, which is not lower than those of the copolymers having no perfluoroalkyl vinyl component.

It is preferable to add 0.3 to 5 mole % of the perfluoroalkyl vinyl monomer in order to produce copolymers which exhibit excellent properties for industrial scale.

It is preferable to supply the perfluoroalkyl vinyl monomer corresponding to the consumed amount during the copolymerization so as to keep the concentration of the perfluoroalkyl vinyl monomer constant.

In the invention, a small amount of the perfluoroalkyl vinyl component is included in the copolymer and is preferably in a range of about 0.1 to 10 mole % especially 0.3 to 5 mole %.

Accordingly, during the copolymerization, it is preferable to add 0.1 to 10 mole % preferably 0.3 to 5 mole % of the perfluoroalkyl vinyl monomer together wth tetrafluoroethylene and ethylene, whereby the copolymers of tetrafluoroethylene and ethylene including 0.1 to 10 mole % preferably 0.3 to 5 mole % of the perfluoroalkyl vinyl component can be obtained. The content of the perfluoroalkyl vinyl component in the copolymer is calculated from a difference between the amounts of the monomer fed in the reactor and the amounts of the monomer recovered after the copolymerization.

The copolymerization reaction of this invention can be carried out by the action of the polymerization initiator, such as a peroxy compound, azo compound, ultraviolet radiation or high energy ionizing radiation, with or without an inert organic solvent or an aqueous medium.

Polymerization can be carried out by bulk polymerization, solution polymerization, suspension polymerization, emulsion polymerization or vapor phase polymerization.

According to the studies for this invention, it is found to be advantageous to use a saturated fluoro- or chlorofluoro-hydrocarbon, (preferably 1 to 4 especially 1 to 2 of carbon atoms) known as a freon type solvent, as the copolymerization reaction medium in order to control the reaction conditions and to increase the reaction rate in an industrial operation. Moreover, the thermal stability, melt processability and chemical resistance of the resultant copolymer can be controlled by the solvent system.

Suitable freon type solvents include: dichlorodifluoromethane, trichloromonofluoromethane, dichloromonofluoromethane, monochlorodifluoromethane, chlorotrifluoromethane, fluoroform, tetrafluoroethane, trichlorotrifluoroethane, dichlorotetrafluoroethane, hexafluoroethane, fluorochloropropane, perfluoropropane, fluorocyclobutane, perfluorocyclobutane, etc. or mixtures thereof. It is best to use a saturated fluoro- or chlorofluoro-hydrocarbon which does not have a hydrogen atom in the molecule, such as dichlorodifluoromethane, trichloromonofluoromethane, trichlorotrifluoroethane, dichlorotetrafluoroethane, perfluorocyclobutane, etc., since such solvents have a tendency of increasing the molecular weight of the resulting copolymer. In general, suitable chlorofluorocarbons are those containing 1-4 carbon atoms, and especially 1-2 carbon atoms. When a freon type solvent is used, the amount used is not limited, although good results are attainable when used in amounts of 0.05-20 mole and especially about 1-10 mole of the solvent per mole of monomer mixture of tetrafluoroethylene, ethylene and perfluoroalkyl vinyl monomer.

The copolymerization reaction can be carried out by using less than 0.05 mole of the solvent per mole of monomer mixture. However, it is advantageous to use more than 1 mole of solvent in order to enhance the rate of the copolymerization. It is possible to use more than 20 moles of solvent, but it is advantageous to use less than 10 moles per mole of monomer mixture for economic reasons, such as the solvent recovery.

A mixture of freon type solvents and other organic solvents or aqueous medium may be used. For example, it is possible to use a mixed reaction medium of freon type solvent and water.

The advantage of using such a mixed solvent consists in easy stirring of the reaction system and easy removal of the heat of reacton. In accordance with the process of the invention, the conditions of the copolymerization can be varied depending upon the type of polymerization initiator or the reaction medium.

When a freon type solvent is used, the reaction temperature is preferably in a range −50° C to +150° C and especially 20° to 100° C in the industrial operation.

The reaction temperature can be determined depending upon the type and amount of solvent, the feed molar ratio of the monomers, the amount of the perfluoroalkyl vinyl monomer, and the type of the polymerization initiator, etc.. When the reaction temperature is too high, the reaction pressure becomes too high. On the other hand, when the reaction temperature is too low, the rate of the copolymerization is lower than the range considered acceptable for industrial operation.

The reaction pressure may range from atmospheric pressure upward and preferably from 2 to 50 Kg/cm²(gauge). Higher or lower pressure can be used if desired.

As indicated above, a wide variety of polymerization initiators can be used depending upon the polymerization system. However, when a freon type solvent is used, it is preferable to use high energy ionizing radiation, such as δ-rays from such radioactive elements as cobalt 60 or cesium 137, or to use an soluble radical polymerization initiator, such as an organic peroxy compound or an azo compound. For example, it is possible to use high energy ionizing radiation of $10 - 10^6$ rad/hour of the dose rate.

Suitable peroxy compounds as the free radical initiator may be the organic peroxides, e.g., benzoylperoxide or lauroylperoxide; the peresters, e.g., t-butyl peroxyisobutyrate; the peroxy dicarbonate, e.g., diisopropylperoxy dicarbonate, etc., or the azo compounds, such as azobisisobutyronitrile, etc..

It is especially preferable to use the initiator, a peroxyester type peroxide having the formula

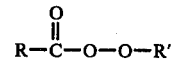

wherein R and R' each represent aliphatic alkyl groups containing from 3 - 13 carbon atoms, in a freon type solvent. Suitable peroxyester type peroxides include t-butyl peroxyisobutyrate, t-butyl peroxyacetate, t-butyl peroxypivalate, t-butyl peroxy-2-ethyl-hexanoate, and b-tutyl peroxylaurate, etc..

The quality of initiator is not critical. However, it is necessary to use a sufficient amount to effectively carry out the copolymerization reaction In general, good results are attainable when the initiator is used in amounts of more than about 0.001 part by weight per 100 parts by weight of total monomers.

The concentration of the free radical initiator in the freon type solvent is usually in a range of 0.005 to 5 parts by weight per 100 parts by weight of total monomers initially charged.

The amount of the freon type solvent is usually in a range of about 1 to 10 mole especially 1.5 to 5 mole per 1 mole of total monomer initially charged. The temperature for copolymerization is usually about 30° to 120° C, and will be largely dependent upon the half-life of the initiator used. For example, it is 50° to 80° C when t-butyl peroxyisobutyrate is used, and it is 40° to 60° C when t-butyl peroxyprivalate is used. In general, it is possible to obtain the copolymer in high yield without spending a long time by selecting the appropriate reaction temperture.

When a freon type solvent is used, the solvent ca be easily separated together with the unreacted monomers from the resulting copolymers after the copolymerization.

The copolymer of this invention can be safely produced in a freon type solvent with a desirable polymerization rate, since the reaction pressure in chlorofluorocarbon can be lower than that in an aqueous medium because of high solubility of the monomers in the former solvent.

Having generally described the invention, a further understanding can be attained by reference to certain specific Examples which are provided herein for purposes of illustration only and are not intended to be limiting in any manner unless otherwise specified.

In the examples, the physical properties of the copolymers were measured by the following methods.

Tensile strength and elongation at high temperature

They were measured by the ASTM D-638 using a specimen of JIS No. 1 at 200° C under a tensile speed of 200 mm/min.

Tensile creep

This was measured by the ASTM D-674 using a specimen of JIS No. 1 at 175° C under 30 Kg/cm$^2$.

Environmental stress cracking

This was measured by the ASTM D-1693 wherein test pieces (38 mm × 13 mm × 1 mm) were notched and bent and were immersed in a chemical and the formation of cracking was observed.

The volumetric flow rate in examples were measured at 300° C and under the load of 30 Kg/cm$^2$.

EXAMPLE 1

In 10 liter of autoclave, 3.46 Kg of trichloromonofluoromethane, 6.52 Kg of trichlorotrifluoroethane and 2.38 g of t-butyl peroxyisobutyrate were charged. Then, 1226 g of tetrafluoroethylene, 82 g of ethylene and 26 g perfluorobutyl ethylene ($CH_2 = CH-C_4F_9$) were charged in it. The copolymerization was carried out with stirring the mixture at 65° C. During the copolymerization, a monomer mixture of tetrafluoroethylene, ethylene and perfluorbutyl ethylene at molar ratios of 53 : 46.3 : 0.7 was fed to maintain the pressure to 15.0 Kg/cm$^2$.

After 5 hours, 460 g of white copolymer was obtained.

The copolymer had molar ratios of $C_2F_4$ : $C_2H_4$ : $CH_2 = CHC_4F_9$ of 53 : 46.3 : 0.7 and a flowing temperature of 267° C, a thermal decomposition temperature of 360° C, a volumetric flow rate of 50 mm$^3$/sec., a melting point of 267° C, and a tensile strength of 55 Kg/cm$^2$, an elongation of 610% at 200° C. No crack on coating at high temperature under any stress was oberserved and an initial strain in tensile creep at 175° C under 30 Kg/cm$^2$ was 3.2% and a heat resistant ageing time at 230° C was longer than 200 hours.

In the environmental stress cracking test, no crack was formed for 10 pieces of the samples in 60% nitric acid.

EXAMPLE 2

In accordance with the process of Example 1 except charging 36.5 g of perfluorohexyl ethylene ($CH_2 = CH C_6F_{13}$) instead of perfluorobutyl ethylene and feeding a monomer mixture of tetrafluoroethylene, ethylene and perfluorohexyl ethylene at molar ratios of 53 : 46.3 : 0.7, the copolymerization was carried out. After 5.4 hours, 507 g of white copolymer was obtained.

The copolymer had molar ratios of $C_2F_4$ : $C_2H_4$ : $CH_2C_6F_{13}$ of 53 : 46.3 : 0.7 and a flowing temperature of 267° C, a thermal decomposition temperature of 360° C, a volumetric flow rate of 60 mm$^3$/sec., a melting point of 267° C and a tensile strength of 52 Kg/cm$^2$ at 200° C, an elongation of 620% at 200° C and an initial strain in tensile creep at 175° C under 30 Kg/cm$^2$ being 3.3% and a heat resistant ageing time at 230° C being longer than 200 hours.

The tensile characteristics at high temperature were excellent.

EXAMPLE 3

In accordance with the process of Example 1 except charging 19.2 g of perfluorobutyl ethylene and feeding a monomer mixture of tetrafluoroethylene, ethylene and perfluorobutyl ethylene at molar ratios of 53 : 46.5 : 0.5, the copolymerization was carried out.

After 4.2 hours, 470 g of white copolymer was obtained.

The copolymer had molar ratios of $C_2F_4$ : $C_2H_4$ : $CH_2 = CHC_4F_9$ of 53 : 46.5 : 0.5 and flowing temperature of 272° C, a thermal decomposition temperature of 360° C, a volumetric flow rate of 47 mm$^3$/sec., a melting point of 269° C and a tensile strength of 60 Kg/cm$^2$ at 200° C, an elongation of 560% at 200° C and an initial strain in tensile creep at 175° C under 30 Kg/cm$^2$ being 3.0% and a heat resistant ageing time at 230° C being longer than 200 hours.

EXAMPLE 4

In 10 liter autoclave, 2.56 Kg of trichloromonofluoromethane, 4.44 Kg of trichlorotrifluoroethane and 2.25 g of t-butyl peroxyisobutyrate were charged and then 1025 g tetrafluoroethylene, 74.0 g of ethylene and 46.9 g of perfluorobutyl ethylene were charged.

The copolymerization was carried out by feeding a monomer mixture of tetrafluoroethylene, ethylene and perfluorobutyl ethylene at molar ratios of 53 : 45.5 : 1.5 at 65° C under 15.0 Kg/cm$^2$. After 11 hours, 690 g of white copolymer was obtainted.

The copolymer had molar ratios of $C_2F_4$ : $C_2H_4 = CH-C_4F_9$ of 53 : 45.5 : 1.5 and a flowing temperature of 265° C, a thermal decomposition temperature of 335° C, a volumetric flow rate of 60 mm$^3$/sec., a melting point of 257° C and a tensile strength of 65 Kg/cm$^2$ at 200° C, an elongation of 800% at 200° C and an initial strain in tensile creep at 175° C under 30 Kg/cm$^2$ being 5.0% and a heat resistant ageing time at 230° C being longer than 200 hours.

We claim:

1. A terpolymer having a volumetric flow rate of 10 to 500 mm$^3$/sec. as determined at 300° C under a load of 30 kg/cm$^2$ containing mainly tetrafluoroethylene and ethylene which consists essentially of components of 40 to 60 mole % of tetrafluoroethylene, 40 to 60 mole % of ethylene and 0.1 to 10 mole % of perfluoroalkyl vinyl monomer having the formula $$CH_2=CH-C_nF_{2n+1}$$

wherein $n$ is an integer of 2 to 10.

2. The terpolymer of claim 1, wherein the perfluoroalkyl vinyl monomer is $$CH_2=CHC_4F_9.$$

3. The terpolymer of claim 1, wherein the perfluoroalkyl vinyl monomer is $$CH_2=CHC_5F_{13}.$$

4. The terpolymer of claim 1, wherein the content of the perfluoroalkyl vinyl monomer is 0.3 to 5 mole %.

5. The terpolymer of claim 1, wherein the molar ratio of $$C_2F_4 \text{ to } C_2H_4$$

is in the range of 45:55 to 55:45.

6. The terpolymer of claim 5, wherein the molar ratio of $$C_2F_4 \text{ to } C_2H_4$$

is higher than 50/50.

7. The terpolymer of claim 1, wherein the volumetric flow rate is 20 to 300 mm$^3$/sec.

8. The terpolymer of claim 1, wherein the flowing temperature of said terpolymer is higher than 240° C.

9. The terpolymer of claim 1, wherein the thermal decomposition temperature of said terpolymer is higher than 310° C.

10. The terpolymer of claim 1, wherein the tensile strength at 200° C of said terpolymer is higher than 30 kg/cm$^2$ and the elongation at 200° C of said terpolymer is higher than 200%.

11. The terpolymer of claim 1, wherein the initial strain in a tensile creep test under 30 Kg/cm$^2$ of said terpolymer is less than 10%.

12. The terpolymer of claim 11, wherein the initial strain in a tensile creep test under 30 kg/cm$^2$ of said terpolymer is less than 5%.

13. A process for producing a terpolymer having a volumetric flow rate of 10 to 500 mm$^3$/sec. containing mainly tetrafluoroethylene and ethylene and containing 0.1 to 10 mole % of a perfluoroalkyl vinyl component, which comprises: copolymerizing tetrafluoroethylene, ethylene and a small amount of a perfluoroalkyl vinyl monomer having the formula $$CH_2=CH-C_nF_{2n-1}$$

wherein $n$ is an integer of 2 to 10, in the presence of a polymerization initiator while maintaining the molar ratio of $C_2F_4$ to $C_2H_4$ greater than 40/60.

14. The process according to claim 13, wherein the molar ratio of $C_2F_4$ to $C_2H_4$ in a feed mixture is higher than 70/30.

15. The process according to claim 13, wherein the molar ratio of $C_2F_4$ to $C_2H_4$ in a feed mixture is higher than 75/25.

16. The process according to claim 14, wherein the molar ratio is in a range of 70/30 to 90/10, and wherein the monomer mixture of tetrafluoroethylene and ethylene of a molar ratio of $C_2F_4$ to $C_2H_4$ of 40/60 to 60/40 is fed during the copolymerization.

17. The process according to claim 15, wherein the molar ratio of $C_2F_4$ to $C_2H_4$ in an initial feed mixture is in a range of 75/25 to 85/15 and wherein the monomer mixture of tetrafluoroethylene and ethylene of a molar ratio of $C_2F_4$ to $C_2H_4$ of 45/55 to 55/45 is fed during the copolymerization.

18. The process according to claim 13, wherein the perfluoroalkyl group of said perfluoroalkyl vinyl monomer has 3 to 8 carbon atoms.

19. The process according to claim 18, wherein the perfluoroalkyl vinyl monomer is $CH_2=CH-C_4F_9$.

20. The process according to claim 18, wherein the perfluoroalkyl vinyl monomer is $CH_2=CH-C_6F_{13}$.

21. The process according to claim 13, wherein the mole % of the perfluoroalkyl vinyl monomer is kept essentially in the range of from 0.1 to 10 based on the total monomers content throughout the copolymerization.

22. The process according to claim 13, wherein the mole % of the perfluoroalkyl vinyl monomer is kept essentially the range of from 0.3 to 5 based on the total monomer content throughout the copolymerization.

23. The process according to claim 13, wherein the copolymerization is conducted in a solvent or saturated fluoro- or chlorofluoro-hydrocarbon.

24. The process according to claim 13, wherein the copolymerization is conducted in a saturated fluoro- or chlorofluoro-carbon solvent.

25. The process according to claim 23, wherein 0.05 to 20 mole of the solvent per 1 mole of initially charged total monomers is used.

26. The process according to claim 23, wherein the copolymerization is conducted at −50° C to 150° C.

27. The process according to claim 23, wherein copolymerization is conducted under a pressure of 2 to 50 Kg/cm$^2$ (gauge).

28. The process according to claim 13, wherein the polymerization initiator is an ionizing radiation.

29. The process according to claim 13, wherein the polymerization initiator is a radical initiator.

30. The process according to claim 29, wherein the radical initiator is a peroxy ester.

31. The process according to claim 29, wherein the radical initiator is added in a ratio of 0.001 to 2 wt. % to the initially charged total monomers.

32. The process according to claim 13, wherein a peroxy ester radical initiator having the formula $$R-\overset{O}{\underset{\|}{C}}-O-O-R'$$

wherein R and R' respectively represent an aliphatic alkyl group is used as the polymerization initiator with the saturated fluoro- or chlorofluoro-hydrocarbon solvent.

33. The process according to claim 32, wherein the copolymerization is conducted at 30+ to 120° C.

34. The process according to claim 32, wherein 1 to 10 mole of the solvent per 1 mole of initially charged total monomers is used.

* * * * *

UNITED STATES PATENT AND TRADEMARK OFFICE
CERTIFICATE OF CORRECTION

PATENT NO. : 4,123,602

DATED : October 31, 1978

INVENTOR(S) : Hiroshi Ukihashi et al

It is certified that error appears in the above-identified patent and that said Letters Patent are hereby corrected as shown below:

Column 5, line 45, delete "freon type" and insert --fluorocarbon--;

line 52, delete "freon type" and insert --fluorocarbon--;

line 68, delete "freon type" and insert --fluorocarbon--.

Column 6, line 14, delete "freon type" and insert --fluorocarbon--;

lines 16-17, delete "freon type" and insert --fluorocarbon--;

line 24, delete "freon type" and insert --fluorocarbon--;

line 43, delete "freon type" and insert --fluorocarbon--;

line 64, delete "freon type" and insert --fluorocarbon--.

UNITED STATES PATENT AND TRADEMARK OFFICE
CERTIFICATE OF CORRECTION

PATENT NO. : 4,123,602
DATED : October 31, 1978
INVENTOR(S) : Hiroshi Ukihashi et al It is certified that error appears in the above-identified patent and that said Letters Patent are hereby corrected as shown below:

Column 7, line 8, delete "freon type" and insert --fluorocarbon--;

line 11, delete "freon type" and insert --fluorocarbon--;

line 22, delete "freon type" and insert --fluorocarbon--;

line 27, delete "freon type" and insert --fluorocarbon--.

Signed and Sealed this

Fourth Day of September 1979

[SEAL]

Attest:

LUTRELLE F. PARKER
*Attesting Officer*    *Acting Commissioner of Patents and Trademarks*